United States Patent Office 3,446,937
Patented May 27, 1969

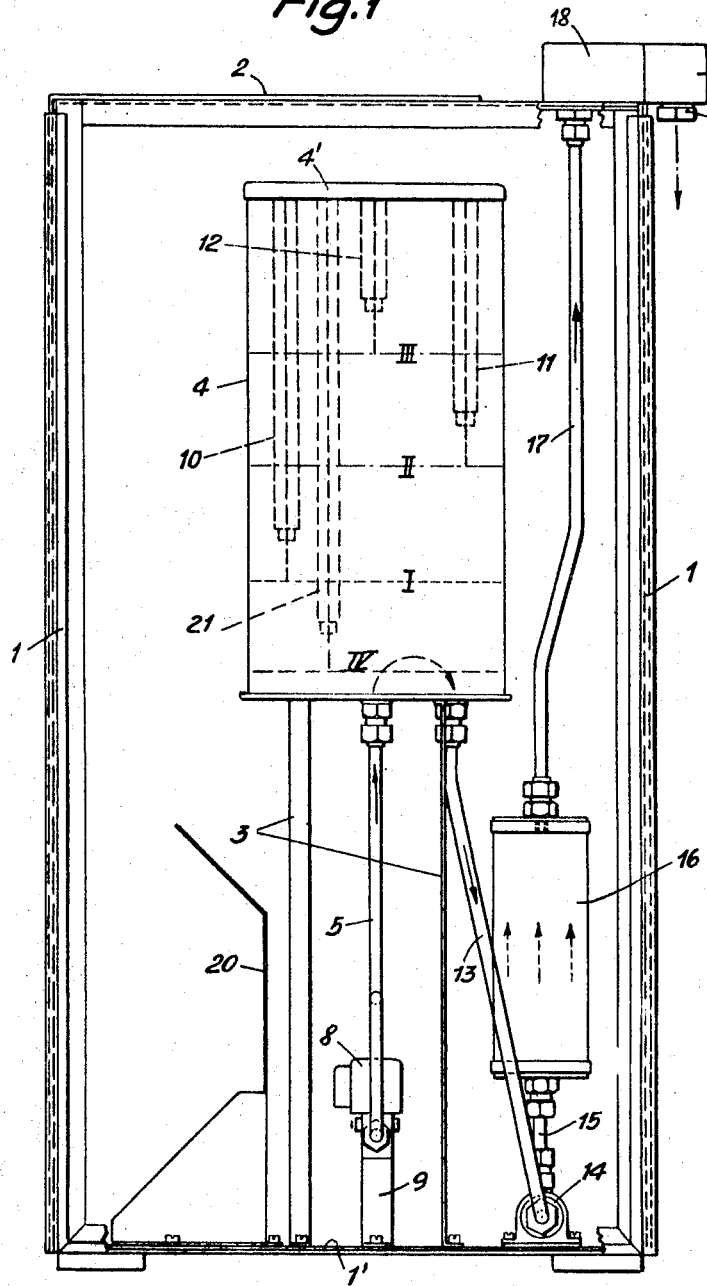

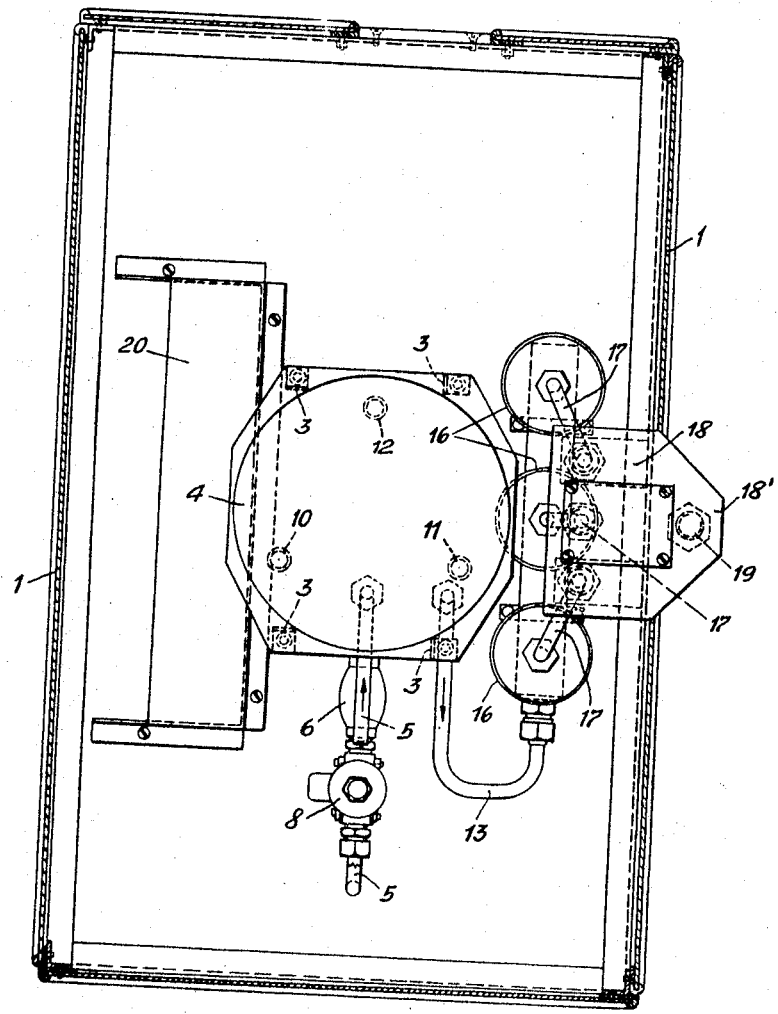

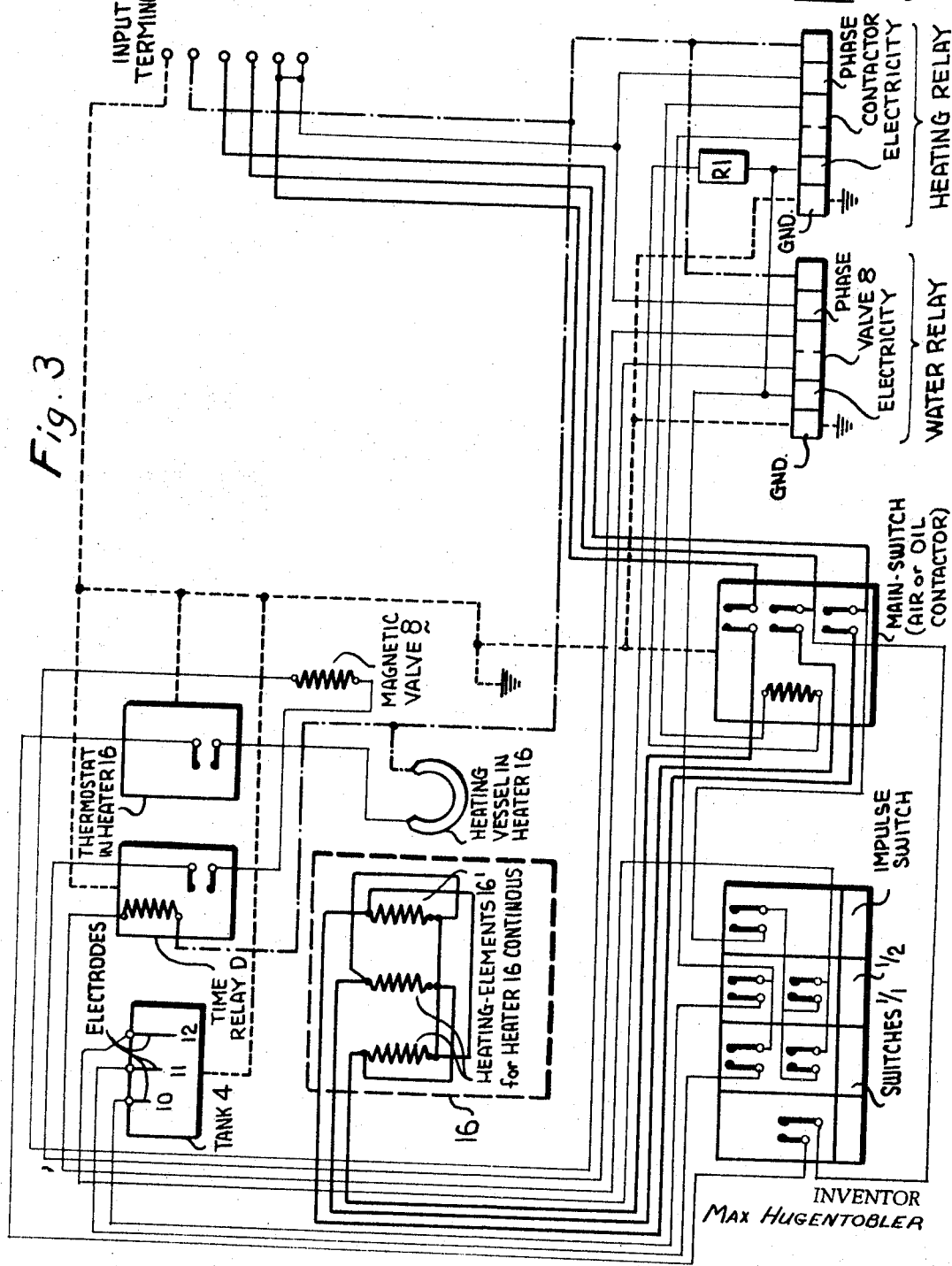

---

3,446,937
WATER HEATER FOR COFFEE MACHINES
Max Hugentobler, 43 Schwandenwiesen,
8052 Zurich, Switzerland
Filed Oct. 23, 1965, Ser. No. 503,545
Int. Cl. F24h 1/20
U.S. Cl. 219—297    6 Claims

ABSTRACT OF THE DISCLOSURE

This provides a water heater having a cold tank in which the level of the water is automatically controlled through the use of electrode switches. The cold water flows to a lower position in heater units having smaller capacities and controlled to heat the water which naturally rises into a collecting chamber from which it is taken for producing coffee.

---

Background of the invention

In known coffee machines a certain quantity of the requisite water is contained in a boiler. Such water quantity is excessive as a rule so that it will be retained in the boiler for an excessive length of time, which is undesirable in particular when the demand is little. With small water quantities, on the other hand, suddenly arising great demands cannot be satisfied. In conventional coffee machines, the water is heated in a single electric boiler. To obtain the necessary heating effect, the heating wire is overstrained whereby the risk of breakage and of trouble is intensified.

Summary of the invention

My present invention relates to a water heater for coffee machines, by means of which said disadvantages shall be removed. In accordance with the invention, this water heater is distinguished by the fact that in a cold water container for discretional adjustment of different contents there are provided level-limiting means that are electrically controlled by means of switches, an outflow extending from said container to a series of juxtaposed electric continuous heaters which communicate with a riser tube that leads to a collecting chamber disposed ahead of the coffee filter unit.

Brief description of drawings

One form of the present invention is shown in the drawing, in which—

FIG. 1 shows the water heater in elevation,
FIG. 2 is a plan view thereof, and
FIG. 3 is a circuit diagram showing the control of the level-limiting means.

Description of specific embodiment

The water heater shown comprises a housing 1 provided with a cover 2. On the bottom 1' of housing 1 is mounted a fresh-water tank 4 on four legs 3. In the water supply pipe 5 is installed a cleaning filter 6 (FIG. 2) and, joining same, an electromagnetic valve 8 that is supported on bottom 1' by a prop 9. On the cover 4' of tank 4 are disposed a plurality of level-limiting means 10, 11 and 12 arranged at different levels and protruding into said tank, said means being constituted by switch electrodes known per se. The means 10, 11 and 12 close the electric circuit in which they are installed, and close valve 8, thus stopping the water supply through pipe 5 as soon as the desired level has been attained. The switch electrode destined for level regulation has, of course, to be turned-on before. An example of the circuitry used in the operation of the water heater shown switches A and B controlling electrode circuits which include electrodes 12 and 10 respectively. If it is desired to fill tank 4 half way, the switch is set to close. When the water introduced into tank 4 reaches electrode 10, the circuitry is closed and the valve 8 is closed. An impules switch C operates to open the magnetic valve 8 when desired. Once opened, the water flows through valve 8 into tank 4 until it reaches the desired level, at the same time the water level reaches a desired electrode 10, 11, or 12 and value 8 closes, the heating elements 16' are switched on. The water will flow from the tank 4 into the heaters 16 as the heated water naturally rises in the riser tubes 17. The heaters 16 are switched when the water level in tank 4 reaches the level of a desired electrode 10, 11, 12 or 21. The use of a well known time release D prohibits the same cyclic operation from repeating itself by preventing the operation of the impulse switch C.

An outflow pipe 13 on tank 4 opens into a horizontal distributer pipe 14 mounted on bottom 1'. Above pipe 14 are mounted three continuous water heaters 16 disposed on a lower level than tank 4 and connected in a downward sense by riser tubes 15 to distributer pipe 14, and in an upward sense by riser tubes 17 to a collecting chamber 18. A portion 18' of chamber which projects outwardly on tank 4, is provided with a union 19 for the supply pipe to the coffee filter unit (not shown in particular). A protective wall 20 serves for housing the wires for the supply and distribution of the current to the various consumer units.

A fourth switching electrode 21 is disposed on cover 4' and is also directed towards the bottom of tank 4. Electrode 21 is destined to establish a connection on the lowest permissible water level IV on order to disconnected the electric heating system in heater 16, which is indispensable for safety reasons. Electrode 21, of course, is constantly switched on, ready for operation, in the appurtenant circuit.

Thanks to the arrangement of three individual intercommunicating continuous heaters 16, the water-heating system shown has a high performance and is durable. Further and by reason of the determination of the contents in the cold-water tank, the water quantity may be set ready in the proper relation to the prospective demand, which ensures a more economic operation. The series of continuous heaters ensures a spontaneous operation and a high output of the coffee machine.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, what I claim as new and desire to secure by Letters Patent is:

1. In a water heater for coffee machines comprising:
    (a) a fresh water tank,
    (b) a plurality of level-limiting means to selectively determine the level of the water in the tank,
    (c) switch means electrically connected to said level-limiting means to control the level-limiting means,
    (d) a water outlet extending from said tank to a series of juxtaposed electric continuous heaters, and
    (e) a riser pipe communicating with said electric heaters and leading to a collecting chamber disposed ahead of a coffee filter unit.

2. In a water heater for coffee machines comprising:
    (a) a fresh water tank,
    (b) a plurality of level-limiting means to selectively determine the level of the water in the tank,
    (c) switch means electrically connected to said level-limiting means to control the level-limiting means, (d) a water outlet extending from said tank to a series of juxtaposed electric continuous heaters,
(e) a riser pipe communicating with said electric heaters and leading to a collecting chamber disposed ahead of a coffee filter unit,
(f) an electromagnetic valve is a feed pipe entering said tank,
(g) said switch means is electrically connected to close said valve when water reaches desired level-limiting means, and
(h) a means responsive to the lowest permissible tank level to turn off the electric heating element of said electric heater.

3. A water heater as defined in claim 2 wherein said level-limiting means are electrode switches.

4. A water heater as defined in claim 3 wherein said electric heaters comprise a plurality of tubular juxtaposed continuous heaters which distribute the water and are disposed between distributor pipes and a collecting chamber, the latter through riser pipes being connected to said electric heaters.

5. A water heater as defined in claim 1 wherein said electric heater is disposed on a lower level than said fresh water tank and said collecting chamber.

6. A water heater as defined in claim 3 wherein said electrode switches project from above into said fresh water tank and are arranged on the cover of the latter.

References Cited

UNITED STATES PATENTS

| | | | |
|---|---|---|---|
| 937,777 | 10/1909 | Dunham | 219—333 X |
| 2,911,511 | 11/1959 | Megarry | 219—314 X |
| 3,270,918 | 9/1966 | Goodrich et al. | 137—392 X |

FOREIGN PATENTS 9,396/32  9/1933  Australia.

RICHARD M. WOOD, *Primary Examiner.*

C. L. ALBRITTON, *Assistant Examiner.*

U.S. Cl. X.R.

99—281; 137—341; 219—314, 319; 222—64